United States Patent [19]

Matsuoka et al.

[11] Patent Number: 4,865,426

[45] Date of Patent: Sep. 12, 1989

[54] VARIABLE ABERRATION IMAGING OPTICAL SYSTEM

[75] Inventors: Kazuhiko Matsuoka; Masayuki Usui; Kazuo Minoura; Takeshi Baba, all of Yokohama; Atsushi Someya, Machida; Yukuo Nishimura, Sagamihara, all of Japan

[73] Assignee: Canon Kabushiki Kaisha, Tokyo, Japan

[21] Appl. No.: 290,806

[22] Filed: Dec. 23, 1988

Related U.S. Application Data

[63] Continuation of Ser. No. 942,044, Dec. 16, 1986, abandoned, which is a continuation of Ser. No. 600,395, Apr. 16, 1984, abandoned.

[30] Foreign Application Priority Data

Apr. 19, 1983 [JP] Japan ................................ 58-67711
Mar. 30, 1984 [JP] Japan ................................ 59-64981

[51] Int. Cl.$^4$ ............................................ G02B 3/14
[52] U.S. Cl. ................................... 350/353; 350/355; 350/418; 350/419
[58] Field of Search ............... 350/319, 351, 353, 354, 350/379, 409, 413, 418, 419, 267, 355

[56] References Cited

U.S. PATENT DOCUMENTS

| | | | |
|---|---|---|---|
| 3,434,779 | 3/1969 | Damen et al. | 350/353 |
| 3,609,584 | 9/1971 | Stitch et al. | 350/353 |
| 3,729,253 | 4/1973 | Moore et al. | 350/413 |
| 3,736,046 | 5/1973 | Zook | 350/379 |
| 4,031,529 | 6/1977 | Borel et al. | 350/351 |
| 4,043,635 | 8/1977 | Siebert | 350/351 |
| 4,108,622 | 8/1978 | Martin | 350/379 |
| 4,124,273 | 11/1978 | Huignard | 350/388 |
| 4,215,914 | 8/1980 | Muchel et al. | 350/413 |
| 4,262,198 | 4/1981 | Gupta et al. | 350/353 |
| 4,466,703 | 8/1984 | Nishimoto | 350/379 |
| 4,509,824 | 4/1985 | Yamasaki et al. | 350/413 |

FOREIGN PATENT DOCUMENTS

611167 6/1978 U.S.S.R. .............................. 350/379

OTHER PUBLICATIONS

Conrady, A. E., "Applied Optics & Optical Design", Dover Pub., New York, 1957, pp. 100–108, 115–120, 333–355.

Sliusarev, G. G., "The Influence of Temperature Gradient of Glass of Optical Systems on the Image Produced by the Latter", Optika I Spektroskopiia (Optics & Spectroscopy) 2–1959, pp. 134–138.

Leite et al., "Low Absorption Measurements by Means of the Thermal Lens Effect Using an He—Ne Laser", App. Phys. Letts., 10–1964, pp. 141–143.

Rieckhoff, K. E., "Self–Induced Divergence of CW Laser Beams in Liquids-A New Nonlinear Effect in the Propagation of Light", App. Phys. Letts., 7–1966, pp. 87–88.

*Primary Examiner*—Bruce Y. Arnold
*Assistant Examiner*—Martin Lerner
*Attorney, Agent, or Firm*—Fitzpatrick, Cella, Harper & Scinto

[57] ABSTRACT

A variable aberration imaging optical system comprises an imaging optical system and an optical device disposed in the optical system and capable of controlling the imaging characteristic of the imaging optical system. The optical device has a medium for forming an index gradient therein by heat, and a device for imparting heat to a desired position on the medium.

6 Claims, 3 Drawing Sheets

VARIABLE ABERRATION IMAGING OPTICAL SYSTEM

This application is a continuation of application Ser. No. 942,044 filed Dec. 16, 1986, now abandoned, which was a continuation of application Ser. No. 600,395 filed Apr. 16, 1984, now abandoned.

BACKGROUND OF THE INVENTION

1. Field of the Invention

This invention relates to an imaging optical system in which the state of aberration can be varied.

2. Description of the Prior Art

In an imaging optical system, it has heretofore been practiced to control aberration in order to improve the aberration or cause a predetermined aberration to occur as in a soft focus.

Generally, in an optical system comprised of a spherical lens group, a non-spherical surface is used as the surface of a part of the lens to correct aberration. However, the working of a non-spherical lens requires a high degree of accuracy using sophisticated techniques and accordingly is very expensive.

Further, some photographing lenses achieve the soft focus function by their entrance pupil being formed into a special shape. In such a method, however, if the diameter of the aperture diaphragm is varied, the soft focus functions correspondingly to the variation in the aperture diameter and therefore, such a method is inconvenient to photographers who require a degree of freedom of the soft focus function.

SUMMARY OF THE INVENTION

It is an object of the present invention to provide an imaging optical system in which the state of aberration, in other words, the state of image formation can be controlled.

It is a further object of the present invention to provide an imaging optical system in which the imaging characteristic of any portion on the imaging plane can be varied.

In an imaging optical system according to the present invention, the above objects are achieved by disposing in the imaging optical system an optical element capable of forming an index gradient in a medium whose refractive index is sufficiently varied by heat, and utilizing in the imaging optical system a phenomenon that the direction of the incident light beam is varied by the index gradient of the optical element.

The means for imparting heat to the medium of the optical element disposed in the imaging optical system according to the present invention is comprised of means capable of independently imparting heat to a plurality of positions on the medium, Accordingly, for the light beam (bundle) passing through the imaging optical system, it is possible to impart a deflecting action to the rays in any portion in the cross-section of the transmitted light beam at any position in the optical system. The most popular means for imparting heat is a combination of a heat-generating resistance member and means for applying a voltage to the resistance member and in this case, the pattern of the heat-generating resistance member provided relative to a thermal effect medium may assume a desired pattern shape along the intended purpose.

The imaging optical system according to the present invention of course includes all of the transmissive types, the reflective types and the transmissive/reflective types, and the aforementioned optical element may also be of the transmissive type or the reflective type.

The thermal effect medium of the optical element used in the imaging optical system according to the present invention may be one having a negative temperature coefficient of refractive index, i.e., liquid such as ethyl alcohol, benzene, ethyl ether, methylene iodide, water, carbon tetrachloride or the like, or solid such as polystyrene, polycyclohexyl methacrylate, polymethyl methacrylate, fluorite ($CaF_2$), halite, crystal, quartz glass, FK5 (trade name: a product of Ohara Kogaku Co., Ltd.) or the like, or one having a positive temperature coefficient of refractive index such as lithium niobate ($LiNbO_2$), calcite, BK7, BF6 (both trade names: products of Ohara Kogaku Co., Ltd.) or the like.

The invention will become fully apparent from the following detailed description thereof taken in conjunction with the accompanying drawings.

DESCRIPTION OF THE PREFERRED EMBODIMENTS

Figure 1A:
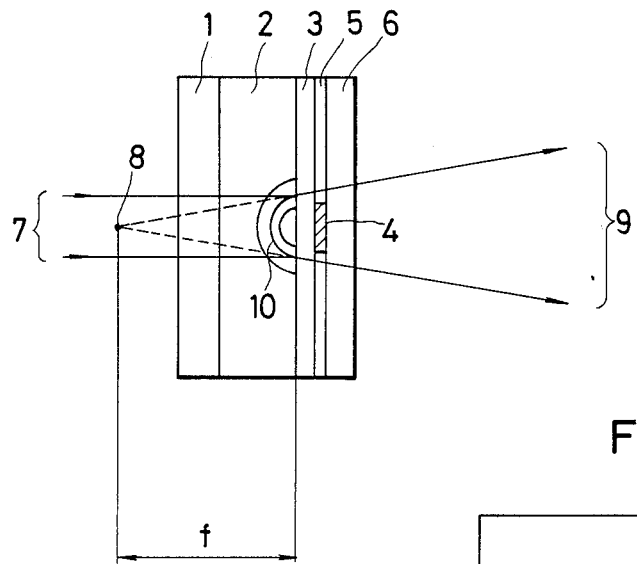
FIGS. 1A, 1B, 2 and 3 illustrate the construction and operational principle of an opto-thermo deflecting device used in the imaging optical system of the present invention.
Figure 1B:
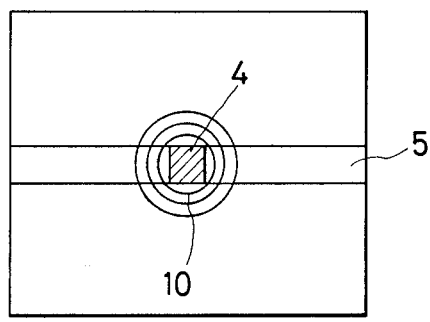
Figure 2:
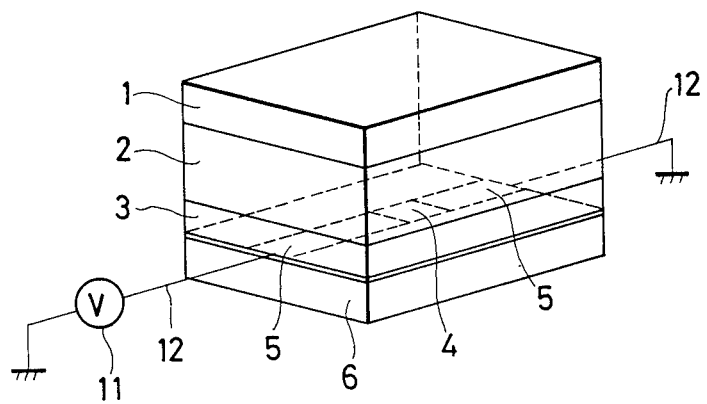
Figure 3:
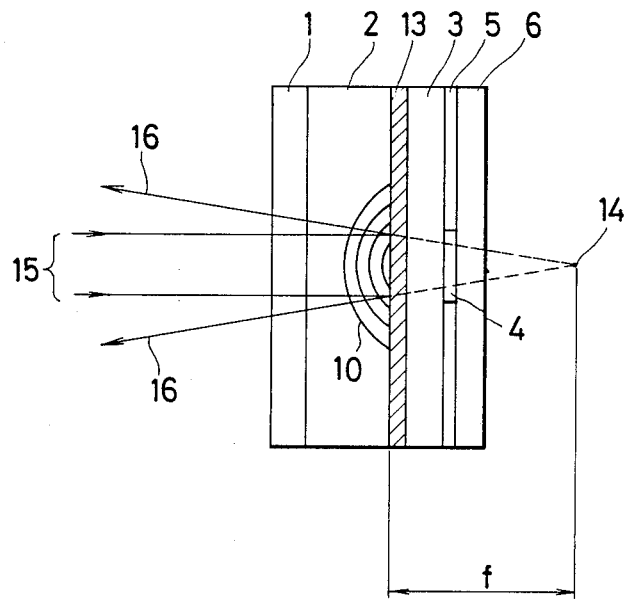

FIGS. 1 to 3 illustrate an opto-thermo deflecting optical device used in the imaging optical system of the present invention. The basic principle of this device is described, for example, in *Nikkei Electronics*, Aug. 16, 1982, pp, 185–193.

In FIGS. 1A and 1B, the device is comprised of a transparent protective plate 1, a thermal effect medium 2 forming an index gradient by heat, an insulating layer 3, a heat-generating resistive member 4, an electrode 5 and a transparent substrate 6. When a voltage is applied to the heat-generating resistance member 4, an index gradient 10 having a shape as shown in which regions of equal refractive indices are combined together is formed in the thermal effect medium by the generated heat. When a light beam 7 enters this portion, the wavefront is converted and a light beam 9 emerges as if it diverged from a point 8. The distance from the boundary surface of the thermal effect medium to the diverging origin (or the converging point) 8 is f and this is defined as the focal length.

The shape of the index gradient formed in the medium of said device is determined by the state of variation in the refractive index for the amount of heat of the medium, that is, whether the value of the refractive index of the medium becomes greater or smaller when the temperature of the medium is increased. Where the value of the refractive index of the medium becomes smaller due to the temperature rise of the medium, the index gradient assumes a mountain-like (convex) shape as shown in FIG. 1A about a position whereat heat is imparted to the medium. In contrast, where the value of the refractive index of the medium becomes greater due to the temperature rise of the medium, the index gradient assumes a valley-like (concave) shape about the position whereat heat is imparted to the medium. Accordingly, the light beam entering the index gradient of such a mountain-like shape becomes a divergent light beam after it has emerged from the index gradient, and the index gradient of such a mountain-like shape performs the function of a concave lens. Also, the light beam entering the index gradient of a valley-like shape becomes a converging light beam after it has emerged from the index gradient, and the index gradient of such a valley-like shape performs the function of a convex lens.

FIG. 2 illustrates means for applying an input voltage to the opto-thermo deflecting optic device described with reference to FIG. 1. The heat-generating resistance member 4 has one end thereof connected to voltage applying means 11 through conductor 12 to the electrode 5 and the other end thereof grounded or held at a predetermined potential When a voltage is applied to the heat-generating resistance member 4 by the voltage applying means as shown in FIG. 2, a current flows through the heat-generating resistance member 4 and an index gradient is formed in the thermal effect medium as previously described and in this case, the amount of generated heat is varied by varying the voltage applied or the pulse application time of the period pulse voltage. As a result of the variation in the amount of generated heat, the index gradient in the thermal effect medium is also varied.

FIG. 3 shows a reflective type opto-thermo deflecting optical device in contrast with the transmissive type opto-thermo deflecting optical device shown in FIGS. 1A, 1B and 2. In FIG. 3, reference numerals similar to those in FIGS. 1A and 1B designate similar members. In FIG. 3, reference numeral 13 denotes a light-reflecting layer of aluminum, When a parallel light 15 enters this device, the wavefront is converted by the index gradient 10 and the light is reflected by the light-reflecting layer 13, whereafter the wavefront is further converted by the index gradient 10 and the light beam 16 emerges from the device as if it diverged from the diverging origin 14.

In the above-described device, an example in which the thermal effect medium 2 is heated by the heat-generating resistance member 4 has been shown, but as other heating means, a heat-absorbing member attached to the thermal effect medium may be irradiated by the use of light or a laser or the thermal effect medium may be directly irradiated by the use of a light or a laser.

Figure 4A:
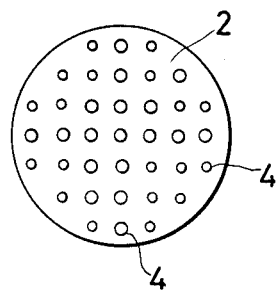
FIGS. 4A and 4B are schematic front views of the opto-thermo deflecting devices used in the imaging optical system of the present invention.
Figure 4B:
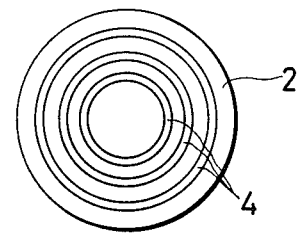

FIGS. 4A and 4B are schematic front views showing embodiments of the opto-thermo deflecting optical device used in the imaging optical system of the present invention. FIG. 4 shows in what pattern the heat-generating resistance members 4 are disposed relative to the thermal effect medium 2, and the size of the medium 2 is coincident with the diameter of the optical system applied. In the device shown in FIG. 4A, the heat-generating resistance members 4 are disposed in the form of a matrix and each of the heat-generating resistance members is connected to the voltage applying means through an electrode, not shown In the device shown in FIG. 4B, the heat-generating resistance members 4 are disposed in the form of concentric circles.

Figure 5:
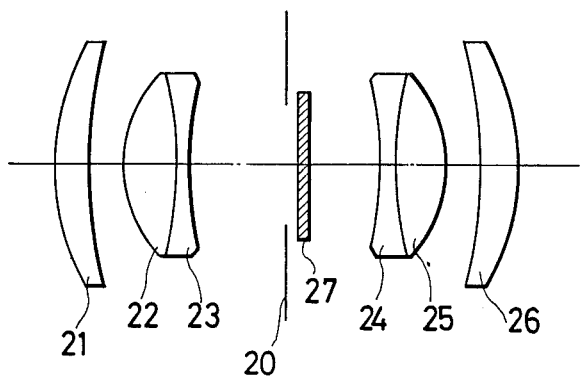
FIG. 5 shows an embodiment of the imaging optical system according to the present invention.

FIG. 5 is a lens cross-sectional view showing an embodiment of the imaging optical system according to the present invention, and particularly shows a construction for effecting the control of spherical aberration. This lens construction is a so-called Gaussian type lens in which lens groups of symmetrical shapes are disposed at the opposite sides of a stop 20. The lens group disposed at each side of the stop comprises a positive meniscus lens 21, 26 disposed most remotely from the stop and having its concave surface facing the stop, and a meniscus lens comprising a biconvex lens 22, 25 and a biconcave lens 23, 24 disposed near the stop and cemented together, and having its concave surface facing the stop. Reference numeral 27 designates an opto-thermal deflecting optical device as shown in FIG. 4A or 4B. The opto-thermal deflecting optical device 27 is disposed near the stop. The reason why this device 27 is disposed near the stop 20 is that when spherical aberration is to be controlled, imparting an action to the high beam near the stop facilitates imparting great influence to spherical aberration. Spherical aberration is usually small near the optical axis and increases at increasing distances from the optical axis. Accordingly, to correct the spherical aberration of the lens system 21-26 by the device 27, the device 27 may be operated so as to impart an influence to the spherical aberration in the marginal portion of the stop. Also, where the spherical aberration of the lens system 21-26 is well corrected, the device 27 may be operated so as to impart an influence to the spherical aberration in the marginal portion of the stop, namely, the portion spaced apart from the optical axis, even when flare is created in the lens system to realize a soft focus. Therefore, the portion of the device 27 which imparts an action to the light beam may be only the marginal portion of the device 27 and accordingly, where the device shown in FIG. 4A is employed, only those of the heat-generating resistance members 4 disposed in the form of a matrix which are disposed in the outer peripheral portion may be caused to generate heat. Also, where the device shown in FIG. 4B is employed, only those of the heat-generating resistance members 4 disposed in the form of concentric circles which are disposed in the outer peripheral portion may be caused to generate heat.

As described above, when the spherical aberration of the lens system is to be corrected, over spherical aberration of the lens system occurs and accordingly, where under spherical aberration is caused to occur by the device 27 to correct the spherical aberration, a medium in which the temperature coefficient dn/dT of refractive index is negative may be used as the the thermal effect medium 2 of the device 27. That is, a medium may be used in which the value of the refractive index becomes smaller as the medium 2 is increased in temperature. Conversely, where under spherical aberration of the lens system occurs and accordingly over spherical aberration is caused to occur by the device 27 to correct the spherical aberration, a medium in which the temperature coefficient dn/dT of refractive index is positive may be used as the thermal effect medium 2 of the device 27.

Also, where as described above, flare is created in the lens system to endow the lens system with the soft focus function, the spherical aberration to be caused to occur may be over or under spherical aberration and accordingly, a medium having a positive or negative temperature coefficient of refractive index may be used as the thermal effect medium.

Figure 6:
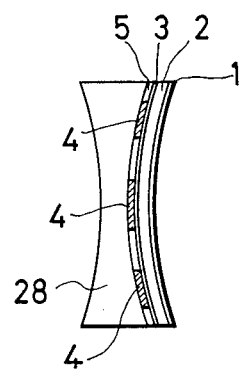
FIG. 6 shows another embodiment of the opto-thermo deflecting device used in the imaging optical system of the present invention.

FIG. 6 shows an embodiment of the optical device used in the imaging optical system of the present invention. This optical device differs from the optical device shown in FIG. 1A in that a lens itself is used as the transparent substrate of the optical device. That is, the optical device shown in FIG. 1A uses a transparent substrate 6 as the substrate of the device, whereas the device shown in FIG. 6 utilizes a lens 28 as the substrate of the optical device. Conversely speaking, a shape is provided to the transparent substrate 6 of the optical device shown in FIG. 1A and this substrate 6 is utilized as a lens. By assuming such a shape of the optical device, it is possible to make the optical system compact.

Although, in the above-described embodiment, the structure of the optical device has been shown as transmissive type and the imaging optical system has also been shown as the transmissive type comprising a lens, it is evident that the reflective type optical device shown in FIG. 3 may be used as the optical device and further, besides a lens, a reflecting mirror may be used to assemble imaging optical system of various constructions.

Figure 7:
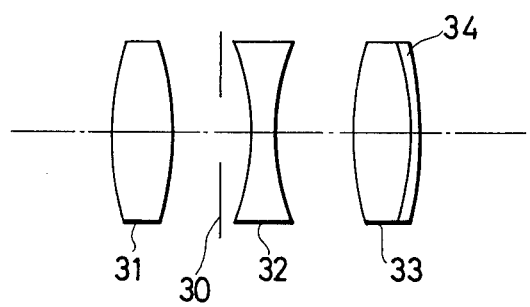
FIG. 7 shows another embodiment of the imaging optical system according to the present invention.

FIG. 7 shows another embodiment of the imaging optical system of the present invention and illustrates the correction of the distortion of the imaging optical system. The imaging optical system shown in FIG. 7 comprises a concave lens 32 and two convex lenses 31 and 33 disposed at the opposite sides of the concave lens 32. A stop 30 is provided between the convex lens 31 and the concave lens 32. Designated by 34 is the above-described opto-thermo deflecting optical device. As described in connection with FIG. 6, the optical device 34 is provided at a position distant from the stop 30 with the convex lens 33 as the transparent substrate. Thus, when distortion is to be corrected, imparting an action to the light beam at a position distant from the stop 30 can more efficiently control distortion. When distortion is to be corrected, it is desirable that the optical device 34 act on a light beam having a great field angle and therefore, of the heat-generating resistance members disposed in the optical device 34, only the heat-generating resistance members lying at positions distant from the optic axis may be caused to generate heat. When distortion is to be corrected, if the distortion occurring only in the imaging optical system 31, 32, 33 is positive, i.e., of the bobbin type, the thermal effect medium used in the optical device 34 is one having a negative temperature coefficient of refractive index, and if the distortion occurring only in the imaging optical system is negative, i.e., is of the barrel type, the thermal effect medium used in the optical device 34 is one having a positive temperature coefficient of refractive index.

What we claim is:

1. A variable aberration imaging optical system comprising:
   an imaging optical system whose spherical aberration is well-corrected;
   optical means provided in said imaging optical system for controlling an imaging characteristic of said imaging optical system;
   a liquid medium for generating a refractive index distribution in response to heat, said liquid medium being provided in said optical means and being spread in a direction substantially perpendicular to an optical axis of said imaging optical system; and
   a plurality of heater means for applying heat to a desired portion of said liquid medium, said plurality of heater means being provided in said optical means and being arranged on a concentric circle centered on the optical axis of said imaging optical system, wherein a spherical aberration is generated in said imaging optical system by heat applied by said plurality of heater means.

2. A variable aberration imaging optical system according to claim 1, wherein said optical means is provided near to a stop position in said imaging optical system and said heater means influences said aberration at a position distant from said optical axis and near to said stop position when said spherical aberration is generated.

3. A variable aberration imaging optical system comprising:
   an imaging optical system whose spherical aberration is well-corrected, said imaging optical system including a stop; and
   an optical device disposed in said imaging optical system and capable of controlling an imaging characteristic of said imaging optical system;
   said optical device including a liquid medium for forming an index gradient therein in response to heat, said liquid medium extending in a plane substantially perpendicular to an optical axis of said imaging optical system;
   said optical device further including a plurality of heating means for applying heat to at least a desired portion of said liquid medium, said plurality of heating means being disposed along concentric circles centered on the optical axis,
   wherein a spherical aberration is generated in said imaging optical system by heat applied by said plurality of heating means and said optical device is disposed near the stop of said imaging optical system and is adapted to control said spherical aberration by imparting an action to a light beam by said optical device at a position distant from the optical axis.

4. A variable aberration imaging optical system comprising:
   an imaging optical system whose spherical aberration is well-corrected; and
   an optical element capable of controlling an imaging characteristic of said imaging optical system, said optical element being disposed near a stop position of said imaging optical system to generate a spherical aberration by imparting an action to a light beam substantially at a position distant from the optical axis of said imaging optical system, and said optical element including a liquid medium capable of changing a refractive index thereof and means for heating the liquid medium to selectively change the refractive index at a desired position of said liquid medium.

5. An optical system comprising:
   an imaging optical system whose spherical aberration is well-corrected; and
   optical means provided in said imaging optical system, said optical means having a medium provided in an optical axis of said imaging optical system, a refractive index of said medium being changeable in accordance with a change of temperature, said optical means further having heater means for heating said medium in such a manner that an index distribution is generated in said medium, wherein said heater means heats said medium in such a manner that a spherical aberration is generated with respect to a light beam passing said imaging optical system.

6. An optical system having:

an imaging optical system whose spherical aberration is well-corrected; and optical means provided in said imaging optical system, said optical means being adapted to generate a spherical aberration with respect to a light beam passing said imaging optical system, said imaging optical system being capable of switching between a first mode in which said spherical aberration is generated and a second mode in which said spherical aberration is extinguished in accordance with an off and on condition of said optical means.

* * * * *

UNITED STATES PATENT AND TRADEMARK OFFICE
CERTIFICATE OF CORRECTION

PATENT NO. : 4,865,426

DATED : September 12, 1989

INVENTOR(S) : KAZUHIKO MATSUOKA, ET AL.

It is certified that error appears in the above-identified patent and that said Letters Patent is hereby corrected as shown below:

COLUMN 1

Line 55, "medium," should read --medium.--.

COLUMN 3

Line 17, "optic device" should read --optical device--.
    Line 22, "potential" should read --potential.--.
    Line 39, "aluminum," should read --aluminum.--.

COLUMN 5

Line 41, "optic axis" should read --optical axis--.
    Line 57, "an" should read --the--.

UNITED STATES PATENT AND TRADEMARK OFFICE
CERTIFICATE OF CORRECTION

PATENT NO. : 4,865,426
DATED : September 12, 1989
INVENTOR(S) : KAZUHIKO MATSUOKA, ET AL.

It is certified that error appears in the above-identified patent and that said Letters Patent is hereby corrected as shown below:

COLUMN 6

Line 17, "an" should read --the--.
    Line 41, "an" (second occurrence) should read --the--.
    Line 58, "an" should read --the--.

Signed and Sealed this

Eleventh Day of June, 1991

*Attest:*

HARRY F. MANBECK, JR.

*Attesting Officer*     *Commissioner of Patents and Trademarks*